(12) United States Patent
LaDue

(10) Patent No.: US 10,673,377 B2
(45) Date of Patent: Jun. 2, 2020

(54) METHOD AND APPARATUS FOR ALTERNATING CIRCUIT SOLAR POWER GENERATION

(71) Applicant: Neotec Energy Pty. Ltd., Wilmington, DE (US)

(72) Inventor: Christoph Karl LaDue, Talent, OR (US)

(73) Assignee: Neotec Energy Pty Ltd., Talent, OR (US)

( * ) Notice: Subject to any disclaimer, the term of this patent is extended or adjusted under 35 U.S.C. 154(b) by 54 days.

(21) Appl. No.: 15/473,276

(22) Filed: Mar. 29, 2017

(65) Prior Publication Data

US 2018/0287554 A1  Oct. 4, 2018

(51) Int. Cl.
| | |
|---|---|
| *H01L 31/052* | (2014.01) |
| *H02S 40/22* | (2014.01) |
| *H02J 7/35* | (2006.01) |
| *H02J 1/10* | (2006.01) |
| *H02S 10/40* | (2014.01) |
| *H02S 40/32* | (2014.01) |
| *H02S 20/30* | (2014.01) |
| *H02J 3/38* | (2006.01) |

(52) U.S. Cl.
CPC .............. *H02S 40/22* (2014.12); *H02J 1/102* (2013.01); *H02J 1/108* (2013.01); *H02J 7/355* (2013.01); *H02S 10/40* (2014.12); *H02S 20/30* (2014.12); *H02S 40/32* (2014.12); *H02J 3/383* (2013.01); *Y02E 10/52* (2013.01)

(58) Field of Classification Search
CPC ................ H02S 40/22; H01L 31/0504; H01L 31/02021; Y02E 10/52; H02J 7/0034; H02J 7/355
See application file for complete search history.

(56) References Cited

U.S. PATENT DOCUMENTS

| | | | | |
|---|---|---|---|---|
| 6,051,954 A | * | 4/2000 | Nagao ...................... | F21S 9/032 320/101 |
| 6,350,944 B1 | * | 2/2002 | Sherif .................... | H01L 31/042 136/244 |
| 2010/0194116 A1 | * | 8/2010 | Mahawili ................ | F03D 9/007 290/55 |
| 2012/0097546 A1 | * | 4/2012 | Kabagambe ............. | C09D 5/24 205/116 |
| 2012/0266941 A1 | * | 10/2012 | Ozeki ..................... | H02S 20/30 136/246 |
| 2016/0099572 A1 | * | 4/2016 | Gupta ..................... | H02J 3/383 307/52 |

* cited by examiner

*Primary Examiner* — Alfonso Perez Borroto
*Assistant Examiner* — Esayas G Yeshaw
(74) *Attorney, Agent, or Firm* — Elliott, Ostrander & Preston, P.C.

(57) ABSTRACT

A solar power generator has a lens through which to receive radiant energy from the sun, a drive shaft positioned near the lens, and a motor coupled to the drive shaft to rotate the drive shaft. A number of solar modules are coupled to the drive shaft, such that as the motor rotates the drive shaft, each one of the solar modules receives radiant energy as it rotates by the lens and produces therefrom a voltage signal.

5 Claims, 8 Drawing Sheets

METHOD AND APPARATUS FOR ALTERNATING CIRCUIT SOLAR POWER GENERATION

TECHNICAL FIELD

Embodiments of the present invention relate to solar power generation.

BACKGROUND

Flat panel solar power generators are inefficient. What is needed is an increase in power generation capability beyond present day flat panel solar generation technology, while at the same time a decrease in the footprint or size requirements for flat panel solar power generation technology.

BRIEF DESCRIPTION OF THE DRAWINGS

The features and advantages of embodiments of the invention will become apparent from the following detailed description of the subject matter in which.

DETAILED DESCRIPTION

A solar power generator according to an embodiment of the invention is a direct current (DC) power generator in which l groups of n solar modules provide for a total of m one-sun solar modules. A solar power generator according to another embodiment of the invention is an alternating current (AC) power generator in which l groups of n solar modules provide for a total of m one-sun solar modules. The DC power generator embodiment comprises l groups of n solar modules mounted on a rotating hub, wired together in a proprietary circuit design, under light concentration (by way of a focusing lens), as one electrically independent DC generator. In one embodiment, each of the n solar modules comprises a side, or facet, of the n solar modules when mounted on the rotating hub, and each of the n solar modules produces a DC pulse, such as a three-volt (3V) DC pulse. In one embodiment of the solar power generator, n=6, providing a six-sided (hexagonal) spinning form factor. However, other embodiments are contemplated in which the number of solar modules, n,=2, 3, 4, 5, 8, 10, 12, etc. For example, in another embodiment, the number of modules, n,=8, providing an octagonal spinning form factor. In any embodiment, each n faceted DC power generator operates as a constant voltage DC generator in which amperage output, and therefore power in watts, is directly proportional to the level of solar concentration. It should be noted that one Sun is a measure of solar irradiance and can also be expressed in watts per meters squared (W/m$^2$), where one Sun equals 1000 W/m$^2$.

Figure 1A:
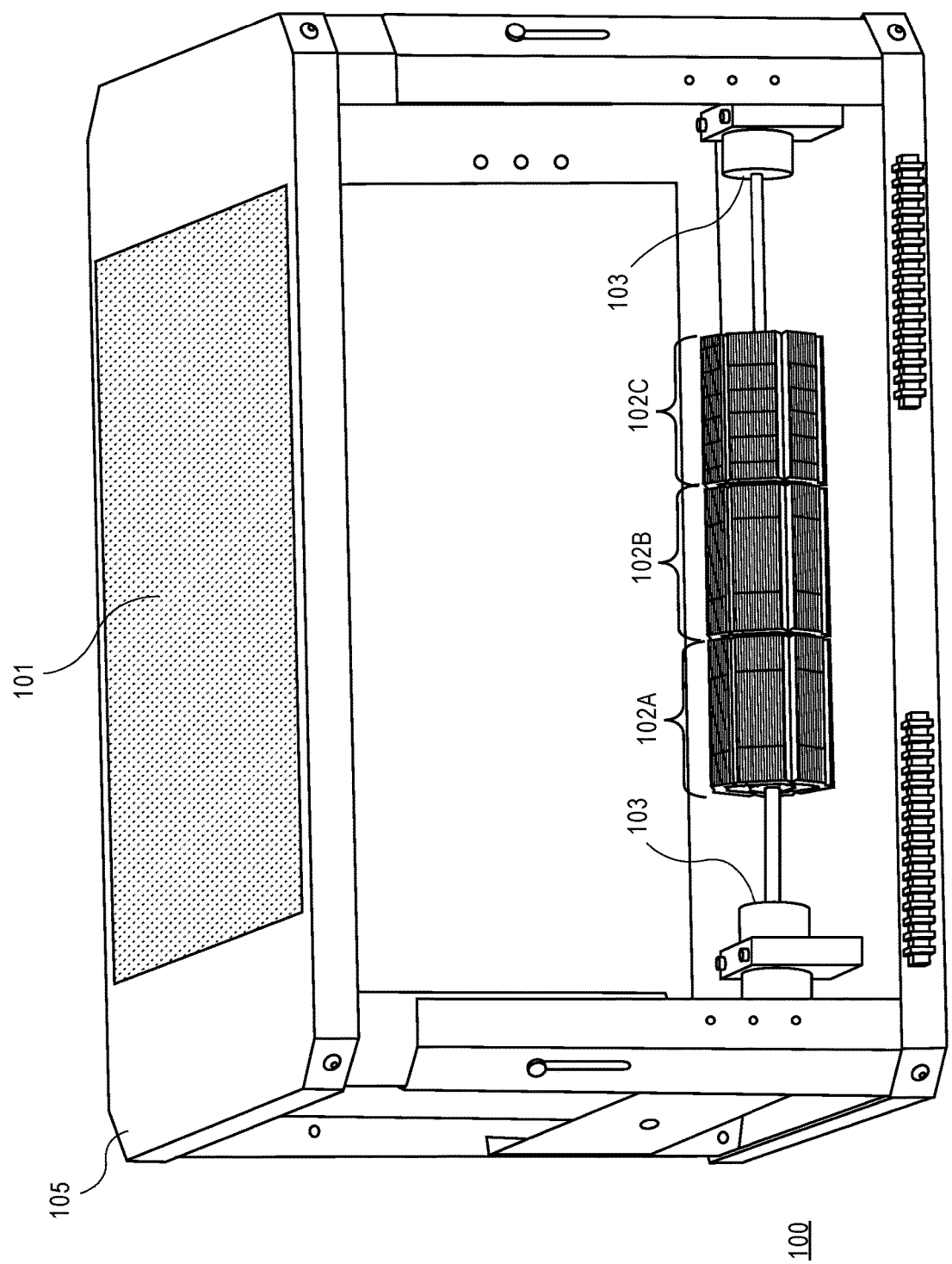
FIG. 1A illustrates a three-dimensional view of an embodiment of the invention.
Figure 1B:
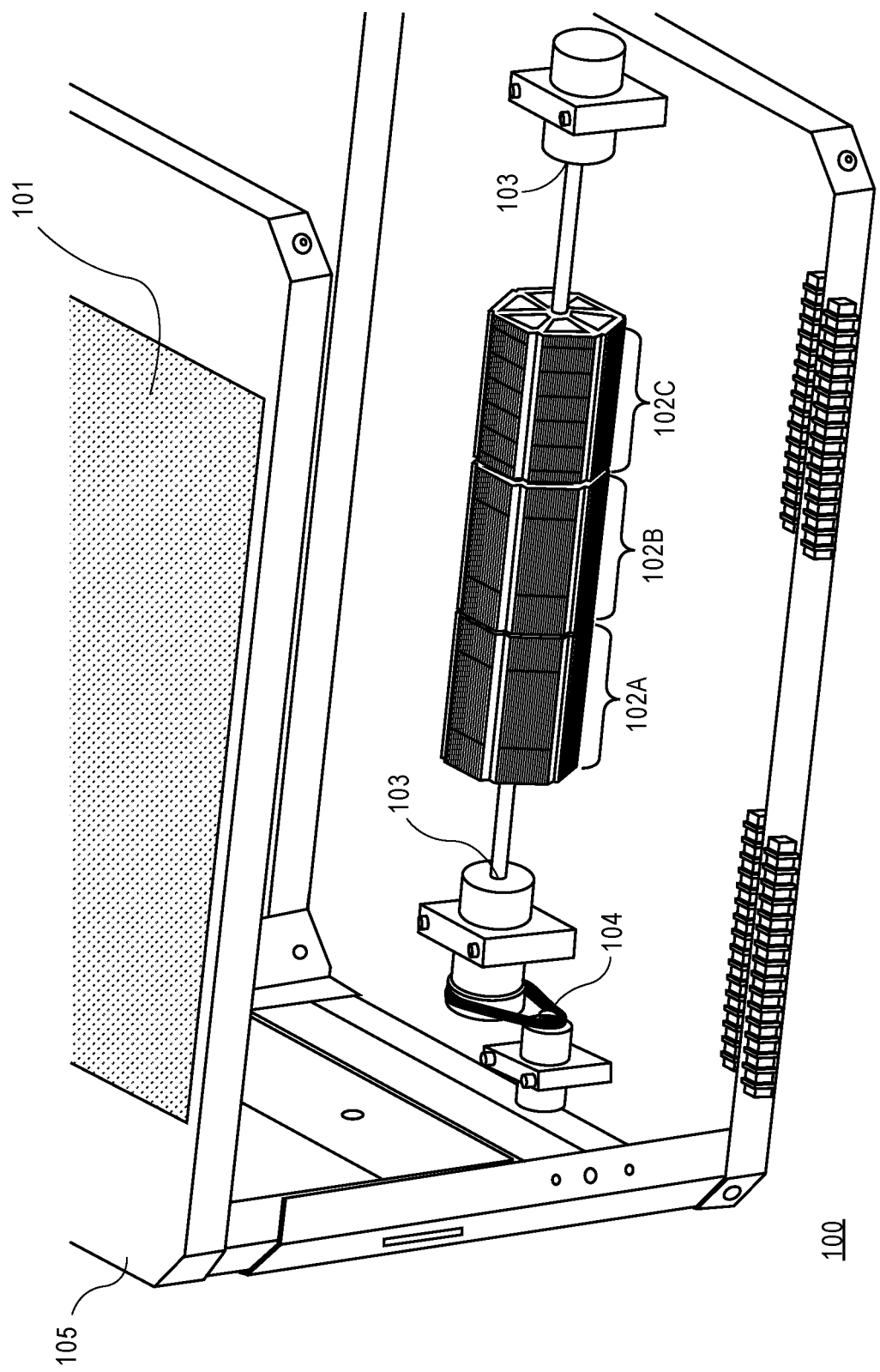
FIG. 1B illustrates a three-dimensional view of an embodiment of the invention.

FIGS. 1A and 1B illustrate the basic components of an embodiment 100 of the invention. A lens, e.g., a linear Fresnel lens 101, concentrates sunlight across l groups of DC generators 102A, 102B, 102C, in which l=3. In the embodiment, two slip rings, e.g., two 16-channel slip rings 103, are utilized to electrically couple each facet (each DC generating solar module) to a respective charging or switching circuit. The 3 groups of DC generators rotate at exactly the same RPM. A drive axle DC motor 104 rotates the three groups of DC generators at a selected RPM, such as 150 RPM. A chassis 105 accommodates the lens 101 and other components. While l=3 in the illustrated embodiment, other embodiments may include one group of DC generators, or a plurality of groups of DC generators other than 3 groups of DC generators. In the embodiments further discussed below, any features described with respect to a single group of DC generators embodiment apply to embodiments in which the number of groups of DC generators, l, is more than one.

Figure 2:
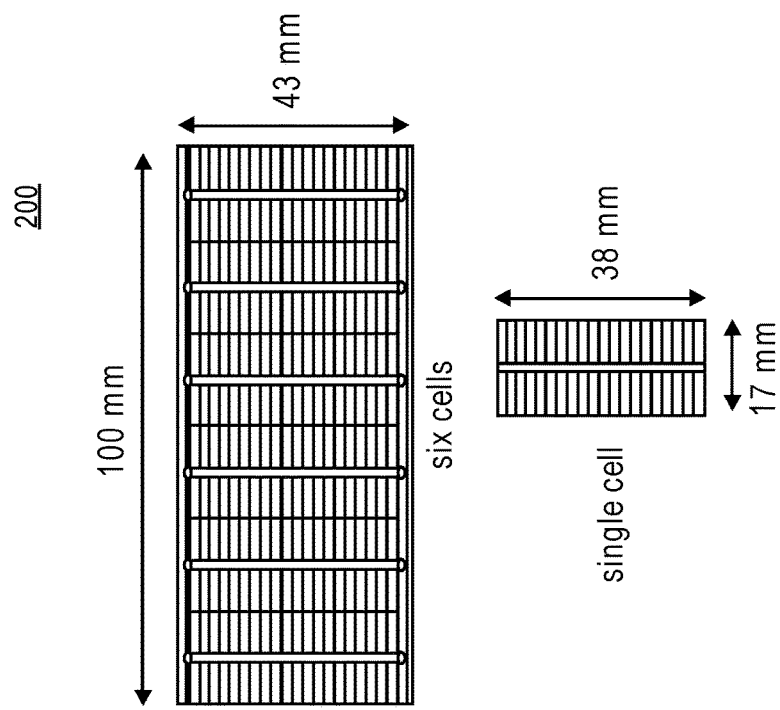
FIG. 2 illustrates a three-dimensional view of one embodiment of the invention in which the number of facets/solar modules equals six.
Figure 2:
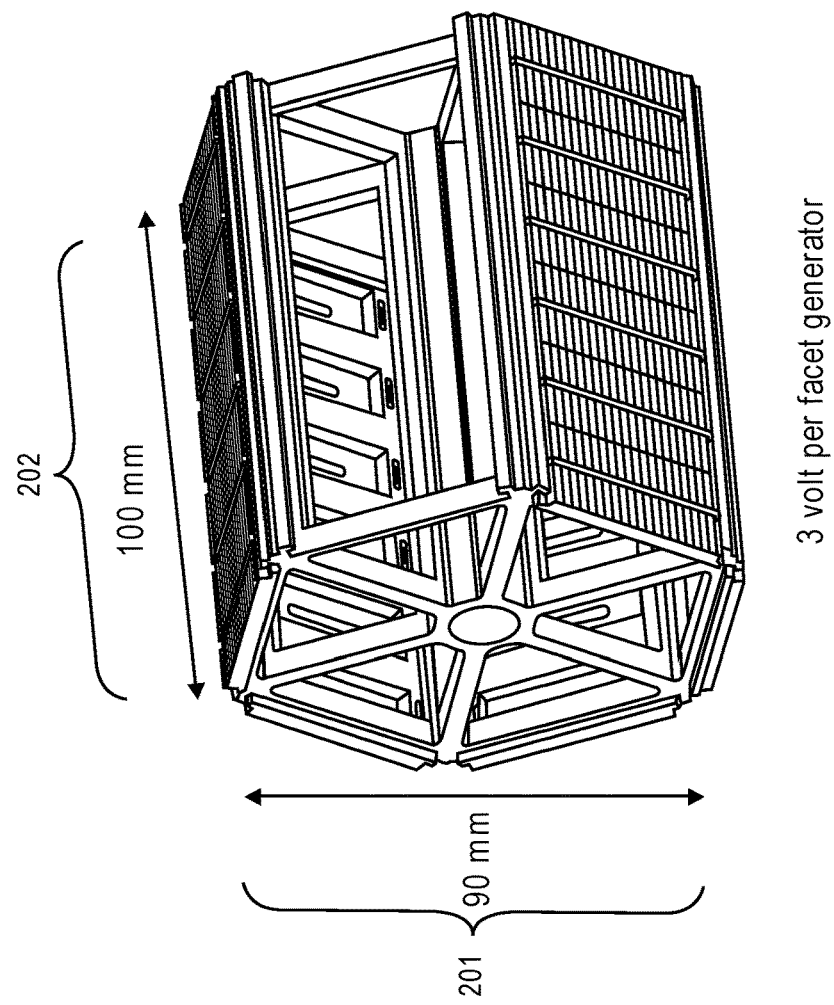

FIG. 2 illustrates an embodiment 200 of one group of DC generators in which the number of solar modules, n,=6, providing a six-sided (hexagonal) spinning form factor 201. Furthermore, each solar module comprises x individual photovoltaic cells 202. In the illustrated embodiment, x=6, but in other embodiments, x may equal one or more photovoltaic cells per solar module. In an embodiment such as illustrated where x>1, the individual photovoltaic cells within each of the n solar modules are wired in series to obtain a particular or desired voltage output, such as 3V. Thus, in the illustrated embodiment, the number of photovoltaic cells, x,=6 for each side (an individual DC generating solar module) of the spinning hexagonal group of solar power generators, and each cell generates 0.5V for a total of 3V per facet/side/solar module/DC generator.

Figure 3:
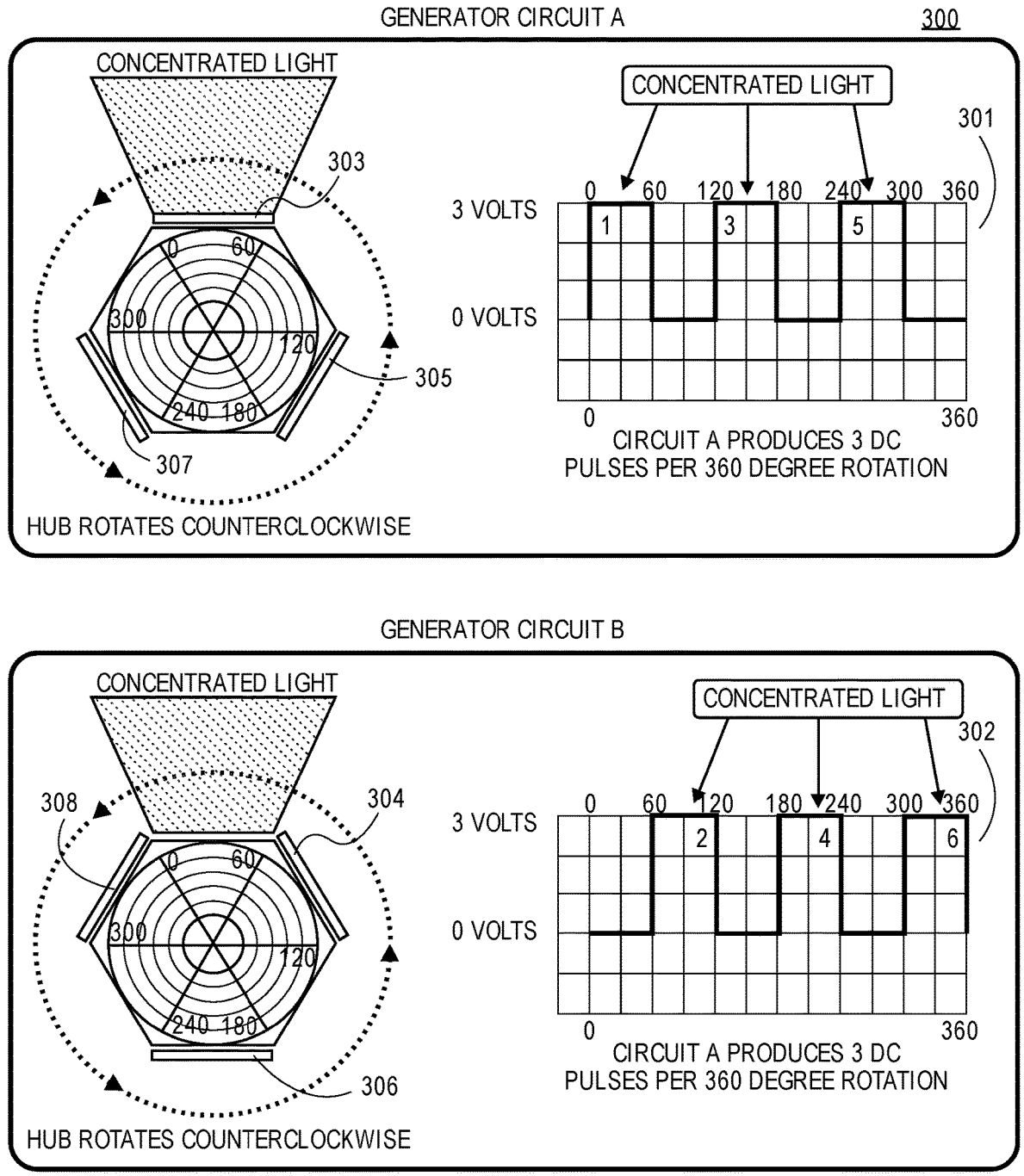
FIG. 3 is a timing diagram of a DC square wave generated by an embodiment of the invention.

With respect to FIG. 3, in one embodiment 300, the group of solar power DC generators outputs two independent DC pulse waveforms 301 and 302. In general, and as shown in the illustrated embodiment, separate groups of nonadjacent solar modules are wired in series to produce multiple independent and separate charging circuits. In the illustrated embodiment, the number of independent charging circuits is two, and the number of solar modules per group (charging circuit) is three, but in other embodiments, a greater number of independent charging circuits may be implemented, with more or less solar modules per group (charging circuit). For example, in alternative embodiments, there may be three or more charging circuits with one or more solar modules per circuit. In embodiment 300, nonadjacent solar modules 303, 305 and 307 are electrically wired together in series to produce one independent and separate charging circuit that generates DC pulse waveform 301, and nonadjacent solar modules 304, 306 and 308 are electrically wired together in series to produce a different, independent, and separate charging circuit that generates DC pulse waveform 302.

It is thought that wiring nonadjacent solar modules together in series, in separate circuits, as opposed to wiring adjacent solar modules together in a single circuit, provides certain advantages in terms of the power being generated by the group of solar power generators. Furthermore, depending on the power generation application, it is appreciated that the number, and/or configuration, of separate charging circuits, the number, and/or configuration, of solar modules wired together and to a separate charging circuit, and the number, and/or configuration, of photovoltaic cells wired together in a single solar module or facet, may be different in order to meet the needs of the particular power generation application.

Indeed, it is contemplated that the number and configuration of separate charging circuits, the number and configuration of solar modules wired together, and/or the number, and/or configuration, of photovoltaic cells wired together, for example, in series, may be changed on the fly, after installation of a solar power generator, according to an embodiment of the invention, in order to meet the needs of the particular power generation application, for example, depending on one or more of the time of day, season, weather conditions, power output needs, power generation costs and rates. In one embodiment, a particular number of l groups of n solar modules is installed, and each solar module has x photovoltaic cells capable of being electrically coupled together in any configuration of one or more independent charging circuits including one or more adjacent or nonadjacent solar modules. A switching matrix and microcontroller may be included in the embodiment of the invention, the matrix coupled to the individual switching/charging circuits and/or solar modules and/or photovoltaic cells, and the microcontroller coupled to the switching matrix. Executable code may be loaded into the microcontroller at an appropriate time (e.g., at time of installation or as an update to an already installed and operating solar power generator). When executed by the microcontroller, the executable code allows for (re)configuration of the l groups of n solar modules of x photovoltaic cells, the number and/or configuration of switching/charging circuits, and/or the number and configuration of solar modules within each charging circuit, and the number and configuration of photovoltaic cells within each solar module, for example, based on user input and/or external factors determined and input by sensors that detect external conditions such as time of day, temperature, weather, power output needs, power generation costs and rates. The user input and/or sensor input, in turn, may be automatic or manual, and may be based on circumstances such as mentioned above, including time of day, season, weather conditions, power generation needs, power generation costs, and power generation consumer rates.

In the l=1 group of DC generators embodiment illustrated in FIG. 3, n=6 solar modules, and x=6 photovoltaic cells per module. Further, there are two independent DC switching, or charging, circuits, in which nonadjacent cells 303, 305 and 307 are wired together in series in a first charging circuit (A), and in which nonadjacent cells 304, 306, and 308 are wired together in series in a second charging circuit (B) independent and separate from the first charging circuit. As the hexagonal configuration of solar modules mounted on the rotating hub rotate by the lens and receive concentrated light from the sun, each module generates a DC pulse waveform as shown in FIGS. 3 at 301 and 302, wherein the DC pulse waveform 301 is 180 degrees out-of-phase with respect to DC pulse waveform 302.

Figure 4:
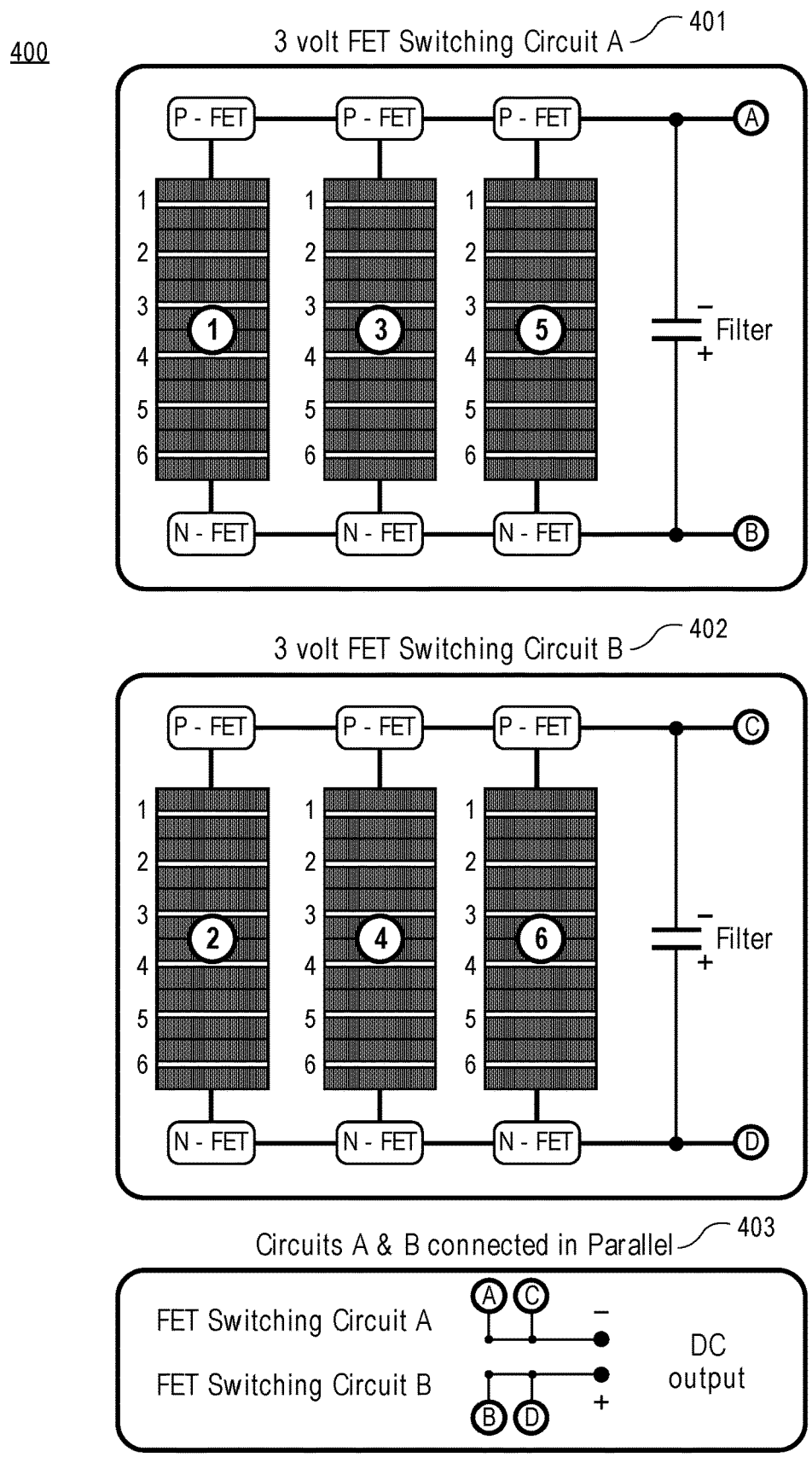
FIG. 4 is an electrical schematic of the switching circuits according to an embodiment of the invention.
Figure 5:
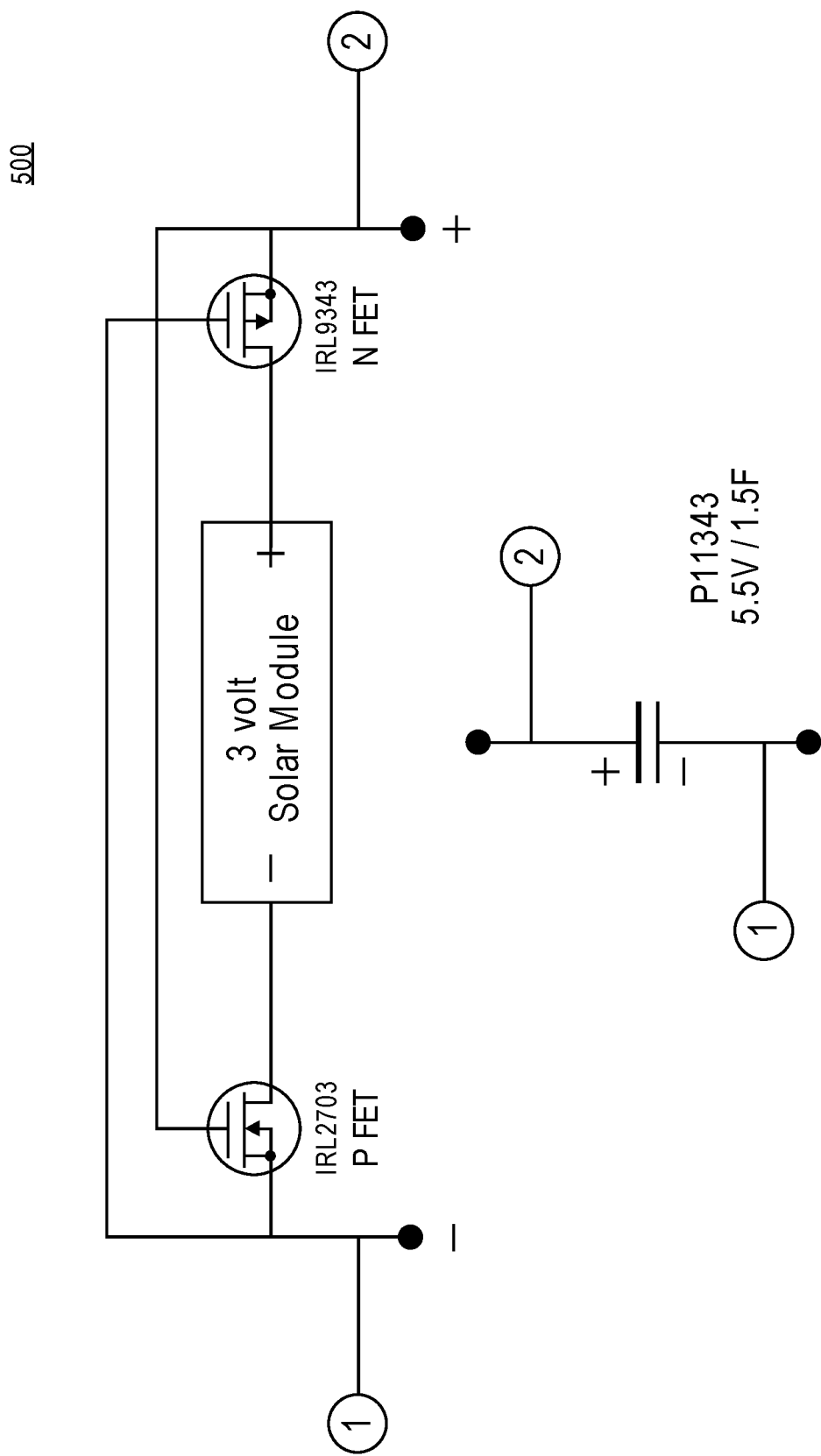
FIG. 5 is an electrical schematic of switching circuit and filter according to an embodiment of the invention.

One embodiment of the invention combines the separate DC pulse waveforms into a single, steady state, DC signal. FIG. 4 illustrates an embodiment of the invention 400 in which the separate switching, or charging, circuits A (401) and B (402), are coupled in parallel as indicated at 403. The switches, e.g., P-FETs and N-FETs illustrated in the figure, prevent reverse current in each 3V switching circuit when the solar modules are not illuminated with concentrated light under the lens. Circuits A and B are coupled together in parallel as illustrated to convert the separate DC pulse waveform generated by circuits A and B into a single steady state, or constant, 3V DC signal. Fig. FIG. 5 provides further details of one embodiment 500 in which an individual solar module is coupled to the FET switching circuit of FIG. 4 in such a manner as to generate a DC pulse signal.

One embodiment of the invention is an alternating current (AC) power generator. FIG. 6 provides a block diagram illustration of the physical configuration of the solar modules according to one embodiment 600. FIG. 6 further provides a block diagram illustration of the electrical configuration of the solar modules according to an AC generator embodiment of the invention 601. FIG. 6 also provides an illustration of the AC signal output by the circuit at 602.

According to the AC power generator embodiment of the invention, l groups of n solar modules provide for a total of m one-Sun solar modules. The AC power generator embodiment comprises l groups of n solar modules mounted on a rotating hub, wired together in a proprietary circuit design, for example, as illustrated in FIG. 6B, under light concentration (by way of a focusing lens), as one electrically independent AC generator. In one embodiment, each of the n solar modules comprises a side, or facet, of the n solar modules mounted on the rotating hub, and each of the n solar modules produces a pulse, for example, of 12.6 volts, with each module producing voltage of opposite polarity relative to the voltage produced by an adjacent module. In one embodiment of the solar power generator, n=12, providing a twelve-sided (hexagonal) spinning form factor. However, other embodiments are contemplated in which the number of solar modules, n,=a plurality of solar modules such as 2, 3, 4, 5, 6, 8, 10, etc. For example, in another embodiment, the number of modules, n,=8, providing an octagonal spinning form factor. In any embodiment, each n faceted AC power generator operates as an alternating voltage AC generator in which amperage output, and therefore power in watts, is directly proportional to the level of solar concentration.

Figure 6A:
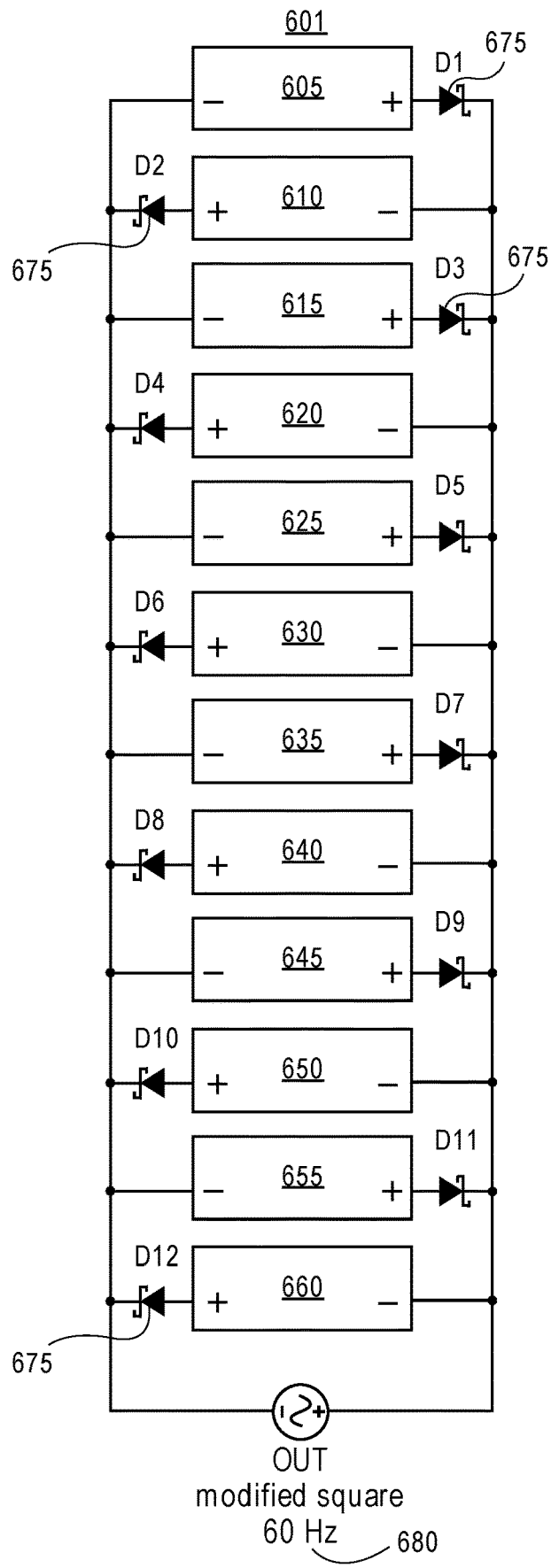
FIG. 6A is an electrical schematic of an embodiment of the invention.
Figure 6B:
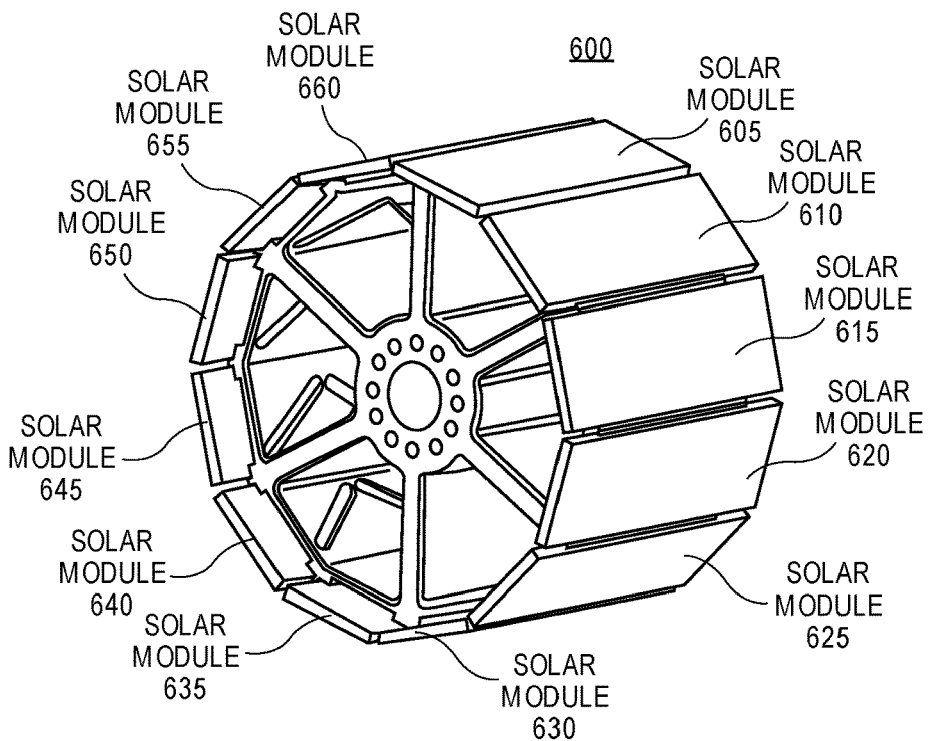
FIG. 6B is a block diagram of an embodiment of the invention.
Figure 6C:
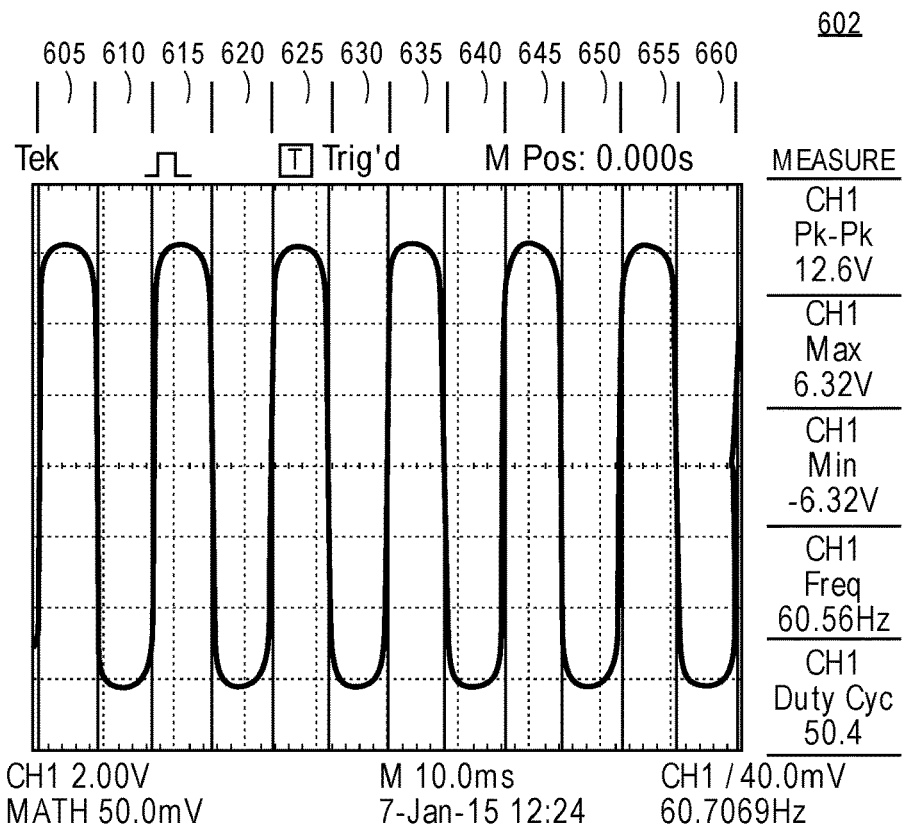
FIG. 6C is a waveform diagram of an AC waveform generated by an embodiment of the invention.

The basic components of this embodiment of the invention are the same as for the DC power generator embodiment described above, but for the manner in which each solar module is electrically coupled in connection with the other solar modules in the embodiment, as illustrated in FIG. 6A, to produce the AC power signal illustrated in FIG. 6B. In particular, with respect to FIGS. 6A and 6B, in one embodiment 601, the group of solar power AC generators output waveform 602 at AC voltage source 680. In general, and as shown in the illustrated embodiment, the solar modules are wired in parallel to produce the AC waveform output 602 at AC voltage source 680. In the illustrated embodiment, the number of solar modules is twelve, but in other embodiments, more or fewer solar modules may be used. In embodiment 601, all solar modules 605-660 are electrically wired together in parallel to produce AC waveform 602. In the embodiment, the polarity of each adjacent solar module is reversed, and a rectifier 675 connected to the positive terminal of each solar model prevents reverse current when the solar modules are not illuminated with concentrated light under the lens.

Depending on the power generation application, it is appreciated that the number, and/or configuration, of solar modules wired together, and the number, and/or configuration, of photovoltaic cells wired together in a single solar module or facet, may be different in order to meet the needs of the particular power generation application.

Indeed, it is contemplated that the number and configuration of solar modules wired together, for example, in parallel, and/or the number, and/or configuration, of photovoltaic cells wired together, for example, in series, may be changed on the fly, after installation of a solar power generator, according to an embodiment of the invention, in order to meet the needs of the particular power generation application, for example, depending on one or more of the time of day, season, weather conditions, power output needs, power generation costs and rates. In one embodiment, a particular number of l groups of n solar modules is installed, and each solar module has x photovoltaic cells capable of being electrically coupled together in any configuration of solar modules. A switching matrix and microcontroller may be included in the embodiment of the invention, the matrix coupled to the individual solar modules and/or photovoltaic cells, and the microcontroller coupled to the switching matrix. Executable code may be loaded into the microcontroller at an appropriate time (e.g., at time of installation or as an update to an already installed and operating solar power generator). When executed by the microcontroller, the executable code allows for (re)configuration of the l groups of n solar modules of x photovoltaic cells, the number and/or configuration of solar modules within each charging circuit, and the number and configuration of photovoltaic cells within each solar module, for example, based on user input and/or external factors determined and input by sensors that detect external conditions such as time of day, temperature, weather, power output needs, power generation costs and rates. The user input and/or sensor input, in turn, may be automatic or manual, and may be based on circumstances such as mentioned above, including time of day, season, weather conditions, power generation needs, power generation costs, and power generation consumer rates.

Thus, in one embodiment, a solar power generator, comprises a lens through which to receive radiant energy from the sun; a drive shaft is positioned near the lens; a motor is coupled to the drive shaft a rotate the drive shaft; a plurality of solar modules is coupled to the drive shaft, such that as the motor rotates the drive shaft, each one of the plurality of solar modules receives radiant energy as it rotates by the lens and produces therefrom a voltage signal; a first circuit is coupled to a first subset of the plurality of solar modules to receive the voltage signals produced by each solar module in the first subset and produce therefrom a first DC voltage square wave; and a second circuit is coupled to a second subset of the plurality of solar modules to receive the voltage signals produced by each solar module in the second subset and produce a second DC voltage square wave; and the second circuit is electrically coupled to the first circuit such that the first DC voltage square wave and the second DC voltage square wave are combined to produce a combined DC voltage signal.

In one embodiment of the solar power generator, the combined DC voltage signal is a constant DC voltage signal. In another embodiment, the combined DC voltage signal may be further combined with other DC voltage signals produce by yet other solar modules to generate a constant DC voltage signal.

In one embodiment of the solar power generator, the first subset of the plurality of solar modules comprises one or more than one nonadjacent solar module, and the second subset of the plurality of solar modules comprises one or more than one nonadjacent solar module different from the first subset.

In one embodiment of the solar power generator, the first circuit and the second circuit each comprises circuitry to positively clamp the respectively received voltage signal so that there is no negative voltage component in the respectively produced DC voltage square wave. In one embodiment, the second DC voltage square wave is 180 degrees out-of-phase with respect to the first DC voltage square wave. The solar power generator in one embodiment further comprises a slip ring via which the first circuit is coupled to the first subset of the plurality of solar modules and via which the second circuit is coupled to the second subset of the plurality of solar modules.

One embodiment of the solar power generator comprises a plurality of photovoltaic cells electrically coupled in series for each solar module.

In one embodiment of the solar power generator, the drive shaft and the plurality of solar modules are concentric with respect to a longitudinal axis.

In another embodiment, an AC solar power generator comprises a lens through which to receive radiant energy from the sun, a drive shaft positioned near the lens, a motor coupled to the drive shaft to rotate the drive shaft, and a plurality of solar modules coupled to the drive shaft, such that as the motor rotates the drive shaft, each one of the plurality of solar modules receives radiant energy as it rotates by the lens and produces therefrom a voltage signal, wherein each solar module is electrically coupled in parallel with the plurality of solar modules and in opposite electrical polarity to an adjacent one of the plurality of solar modules, wherein the plurality of solar modules thereby produces an alternating current voltage signal.

While the disclosed subject matter has been described with reference to illustrative embodiments, this description is not to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A solar power generator, comprising:
a lens, positioned in a two-dimensional plane, through which to receive radiant energy from the sun;
a drive shaft having a longitudinal axis positioned near and substantially parallel to the two-dimensional geometric plane of the lens;
a motor coupled to one end of the drive shaft to rotate the drive shaft about the longitudinal axis at a constant speed; and
a plurality of solar modules coupled to the drive shaft, each forming one of a corresponding plurality of rectangular facets of a cylinder centered about the drive shaft, such that as the motor rotates the drive shaft at a constant speed, each of the plurality of solar modules repeatedly rotates by the lens for a respective time period, receives radiant energy during the respective time period, and produces therefrom a voltage signal pulse during the respective time period, wherein the plurality of solar modules are electrically coupled in parallel and in opposite electrical polarity with adjacent ones of the plurality of solar modules, to output an alternating current voltage signal comprising a times series of voltage signal pulses produced during the respective time periods by the plurality of solar modules.

2. The solar power generator of claim 1, wherein a rectifier is coupled to an electrically positive terminal of each of the plurality of solar modules to prevent output of a reverse current when the solar module is not rotating by the lens for the respective time period and thus not receiving radiant energy from the sun through the lens.

3. The solar power generator of claim 1, further comprising a slip ring via which the plurality of solar modules is coupled to an alternating current output terminal.

4. The solar power generator of claim 1, wherein each of the plurality of solar modules comprises a plurality of photovoltaic cells electrically coupled in series.

5. The solar power generator of claim 1 wherein the drive shaft and the plurality of solar modules are concentric with respect to a longitudinal axis.

\* \* \* \* \*

UNITED STATES PATENT AND TRADEMARK OFFICE
CERTIFICATE OF CORRECTION

PATENT NO. : 10,673,377 B2
APPLICATION NO. : 15/473276
DATED : June 2, 2020
INVENTOR(S) : Christoph Karl LaDue Page 1 of 1

It is certified that error appears in the above-identified patent and that said Letters Patent is hereby corrected as shown below:

On the Title Page

Please add the following in Column 1:
Related U.S. Application Data
(60) Provisional application No. 62/314,882, filed on March 29, 2016.

Signed and Sealed this
Fourth Day of August, 2020

Andrei Iancu
*Director of the United States Patent and Trademark Office*